(12) United States Patent  
Uchida et al.

(10) Patent No.: US 6,975,052 B2  
(45) Date of Patent: Dec. 13, 2005

(54) TERMINAL ARRANGEMENT OF MOTOR AND CAPACITOR MOTOR

(75) Inventors: Keiji Uchida, Gunma (JP); Hiroyuki Tanaka, Gunma (JP); Hitoshi Ishii, Gunma (JP); Yasushi Niwa, Gunma (JP); Toshio Kobayashi, Gunma (JP)

(73) Assignee: Japan Servo Co., Ltd., Gunma (JP)

( * ) Notice: Subject to any disclaimer, the term of this patent is extended or adjusted under 35 U.S.C. 154(b) by 0 days.

(21) Appl. No.: 10/921,392

(22) Filed: Aug. 19, 2004

(65) Prior Publication Data

US 2005/0046289 A1 Mar. 3, 2005

(30) Foreign Application Priority Data

Aug. 29, 2003 (JP) .................................. 2003/306902  
Aug. 29, 2003 (JP) .................................. 2003/306903

(51) Int. Cl.[7] .................................................. H02K 7/00
(52) U.S. Cl. ........................................... 310/71; 310/89
(58) Field of Search ........................... 310/71, 89, 254, 310/216–218

(56) References Cited

U.S. PATENT DOCUMENTS 4,182,026 A * 1/1980 Searle .......................... 29/596
6,414,408 B1 * 7/2002 Erdman et al. ............ 310/68 R
6,710,475 B2 * 3/2004 Nishida et al. ............. 310/214

FOREIGN PATENT DOCUMENTS

| JP | 30562/81 | 8/1979 |
| JP | 59 3748/1984 | 1/1984 |
| JP | 35554/86 | 3/1986 |
| JP | 2000308392 A | 11/2000 |
| JP | 51513/02 | 2/2002 |

* cited by examiner

*Primary Examiner*—Dang Le  
(74) *Attorney, Agent, or Firm*—Boyle Fredrickson Newholm Stein & Gratz S.C.

(57) ABSTRACT

A terminal arrangement of a motor has a terminal base formed with a plurality of terminal pins, the terminal base being fixed detachably on a stator iron core of a motor, terminal pins formed on bobbins, connected electrically with windings wound around the bobbins, a printed circuit board arranged on the stator iron core so as to connect electrically the terminal pins formed on the bobbins with the terminal pins formed on the terminal base, and an end bracket arranged so as to cover the printed circuit board. A hole is formed in the stator iron core, and an earth electrode is projected from the terminal base, and inserted into the hole so as to be connected electrically with the stator iron core, the earth electrode being connected electrically to one of the terminal pins formed on the terminal base. A capacitor motor has a motor having a stator iron core, and a phase advancing capacitor fixed detachably on the stator iron core.

4 Claims, 9 Drawing Sheets

US 6,975,052 B2

TERMINAL ARRANGEMENT OF MOTOR AND CAPACITOR MOTOR

BACKGROUND OF THE INVENTION

1. Field of the Invention

The present invention relates to a terminal arrangement of a motor having bobbins and windings, and a capacitor motor having a phase advancing capacitor.

2. Description of the Prior Art

Japanese Utility Model Laid-Open No. 3748/1984 proposes a motor wherein a stator yoke and stator magnetic poles are separated from each other, so that each of said magnetic poles can be inserted into each winding wound around each bobbin.

Japanese Patent Laid-Open No. 308392/2000 discloses a capacitor motor having a phase advancing capacitor.

In FIG. 1 and FIG. 2 showing another conventional motor, a reference numeral 1 denotes windings each wound around each bobbin 2, numeral 3 denotes terminal pins each projected from each bobbin 1, numeral 4 denotes lead wires connected electrically to the terminal pins 3, respectively, numeral 5 denotes a terminal block connected to the lead wires 4, numeral 6 denotes a stator iron core, numeral 7 denotes an end bracket arranged at one side surface of the stator iron core 6, and numeral 8 denotes a box like phase advancing plastic capacitor.

In the above conventional motor, one end of each of the lead wires 4 must be connected electrically to one of the terminal pins 3 projected from the bobbin 2, and the other end of each of the lead wires 4 must be taken out to the outside of the motor and connected to the terminal block 5. Further, in a motor to be grounded having an earthing pin projected from the stator iron core, it is necessary to connect electrically the lead wire 4 to the earthing pin.

Such connection work is very hard and complicated.

Further more, it is difficult to fix the capacitor 8 to the motor and the wiring of the capacitor 8 is very complicated, so that the fabrication cost is increased.

SUMMARY OF THE INVENTION

An object of the present invention is to solve the above defects.

Another object of the present invention is to provide a terminal arrangement of a motor comprising a terminal base formed with a plurality of terminal pins, the terminal base being fixed detachably on a stator iron core of a motor, terminal pins formed on bobbins, connected electrically with windings wound around the bobbins, a printed circuit board arranged on the stator iron core so as to connect electrically the terminal pins formed on the bobbins with the terminal pins formed on the terminal base, and an end bracket arranged so as to cover the printed circuit board.

Still another object of the present invention is to provide the terminal arrangement of the motor further comprising a hole formed in the stator iron core, and an earth electrode projected from the terminal base, which is inserted into the hole so as to be connected electrically with the stator iron core, the earth electrode being connected electrically to one of the terminal pins formed on the terminal base.

A further object of the present invention is to provide a capacitor motor comprising a motor having a stator iron core, and a phase advancing capacitor fixed detachably on the stator iron core.

Still further object of the present invention is to provide the capacitor motor further comprising terminal pins formed on the phase advancing capacitor, terminal pins formed on bobbins, connected electrically with windings wound around the bobbins, a printed circuit board arranged on the stator iron core so as to connect electrically the terminal pins formed on the bobbins with the terminal pins formed on the phase advancing capacitor, and an end bracket arranged so as to cover the printed circuit board.

Yet further object of the present invention is to provide the capacitor motor further comprising a groove formed on one of the stator iron core and the phase advancing capacitor, and a rib formed on the other of the stator iron core and the phase advancing capacitor, the rib being inserted detachably into the groove for fixing.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

DESCRIPTION OF THE PREFERRED EMBODIMENT

Figure 1:
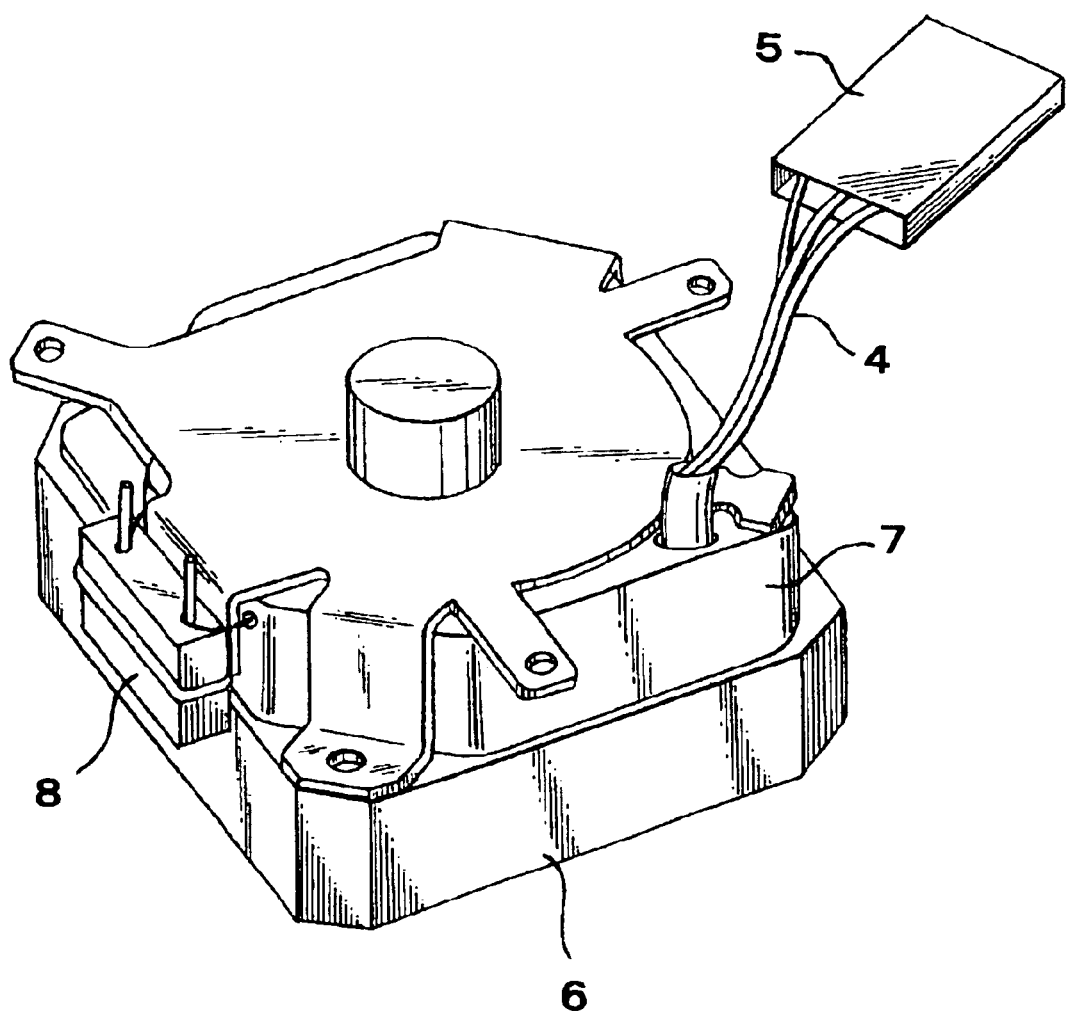
FIG. 1 is a perspective view of a conventional motor.
Figure 2:
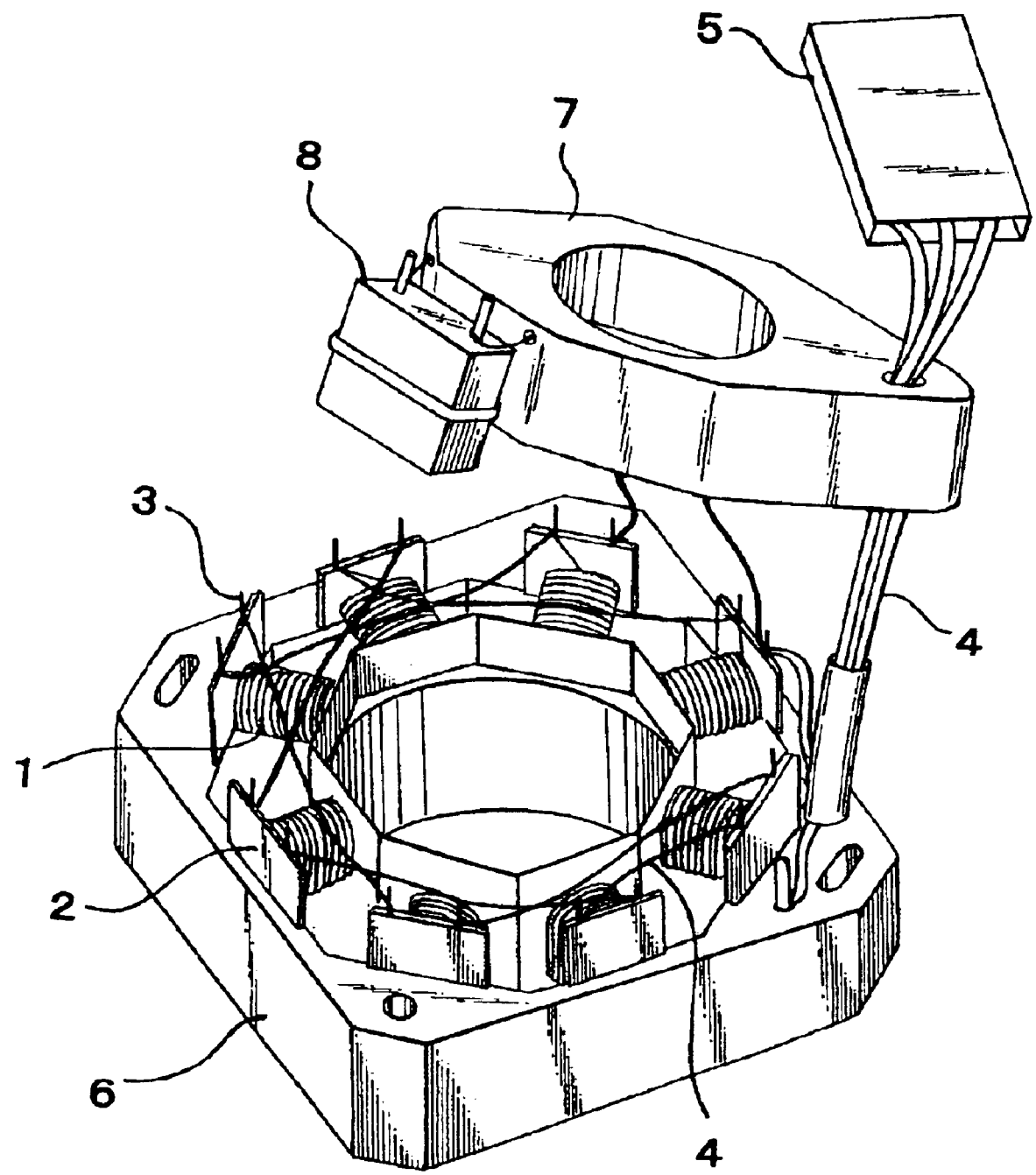
FIG. 2 is an exploded perspective view of the conventional motor shown in FIG. 1.

A first embodiment of a terminal arrangement of a motor according to the present invention will be explained with reference to FIG. 3 to FIG. 5. Parts of the motor which are similar to corresponding parts of the conventional motor shown in FIG. 1 and FIG. 2 have been given corresponding reference numerals and need not be further redescribed.

Figure 3:
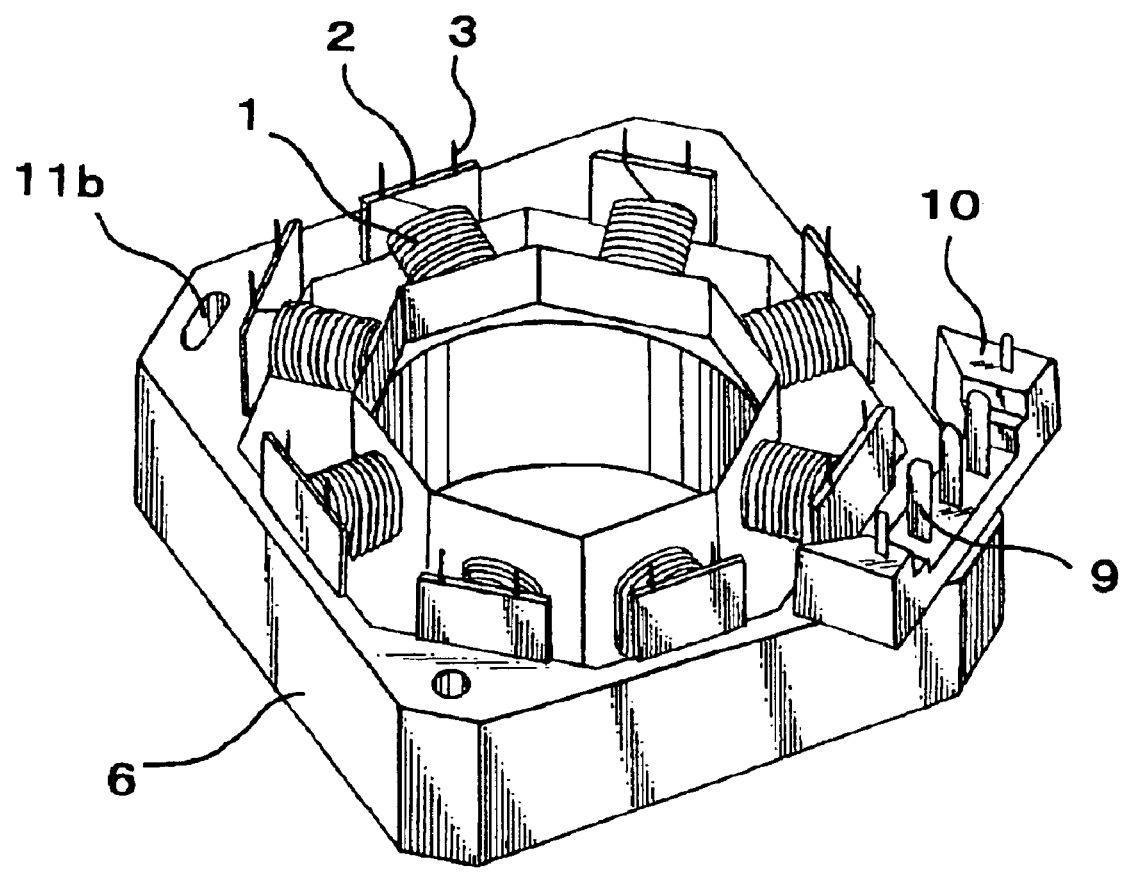
FIG. 3 is a perspective view of a part of a motor having a terminal arrangement according to the present invention.
Figure 4:
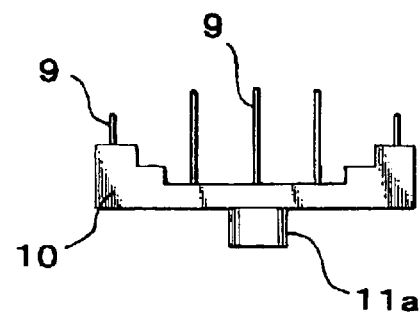
FIG. 4 is a front view of a terminal base of the terminal arrangement shown in FIG. 3.
Figure 5:
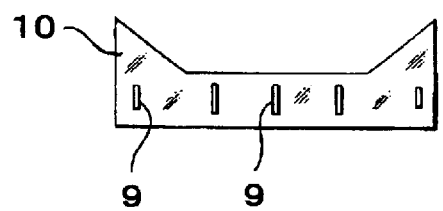
FIG. 5 is a plan view of the terminal base shown in FIG. 4.

As shown in FIG. 3 to FIG. 5, a terminal base 10 is fixed detachably on a stator iron core 6. A plurality of terminal pins 9 are projected from an upper surface of the terminal base 10. A rod 11a is projected from a lower surface of the terminal base 10, and inserted into a hole 11b formed on the stator iron core 6 so that the terminal base 10 can be fixed to the stator iron core 6.

Figure 6:
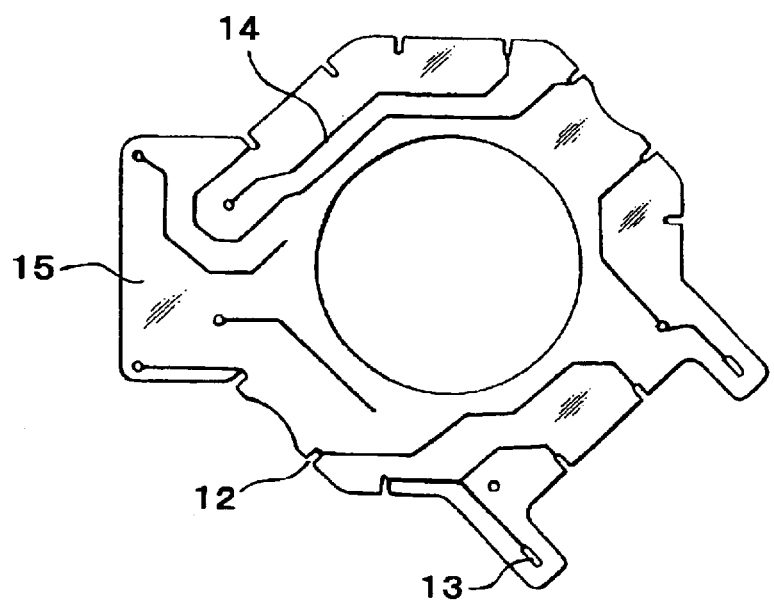
FIG. 6 is a plan view of a printed circuit board of the terminal arrangement of the motor according to the present invention.

A printed circuit board 15 is formed with holes 12 and 13 for receiving therein terminal pins 3 projected from the bobbins 2 and the terminal pins 9 projected from the terminal base 10, and with printed circuits 14 for connecting electrically the terminal pins 3 and the terminal pins 9, as shown in FIG. 6. The printed circuit board 15 is arranged on one side surface of the motor having the terminal pins 3 and 9, so that the terminal pins 3 and 9 are inserted into the holes 12 and 13, respectively, and that the pins 3 and the pins 9 are connected electrically by the printed circuits 14.

In case of a motor to be grounded, the rod 11a projected from the lower surface of the terminal base 10 is made of metal and connected to one of the terminal pins 9 projected from the terminal base 10.

Figure 7:
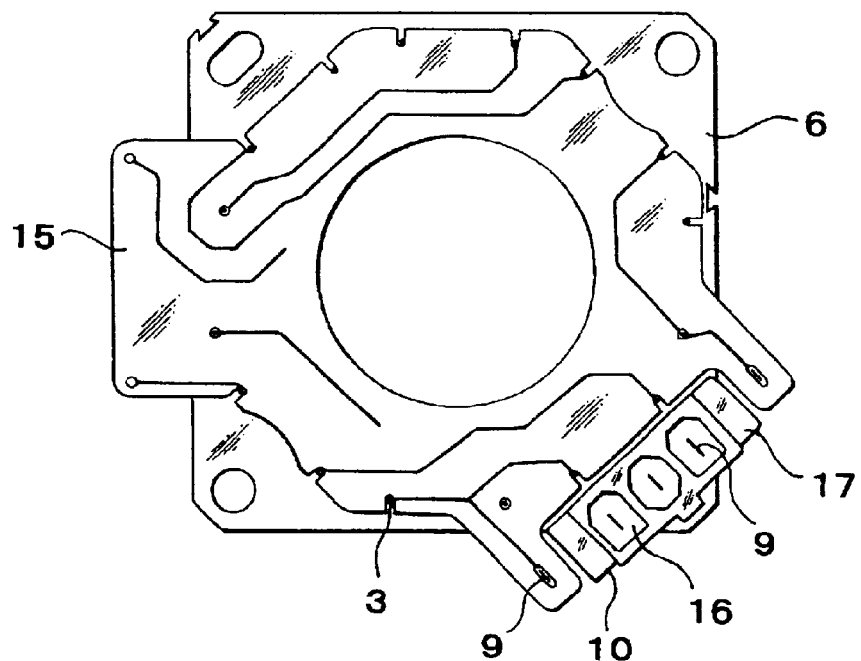
FIG. 7 is a plan view of a part of the terminal arrangement of the motor according to the present invention.

The terminal base 10 is covered with an insulating plate 17 having holes 16 each surrounding each terminal pin 9, as shown in FIG. 7.

Figure 8:
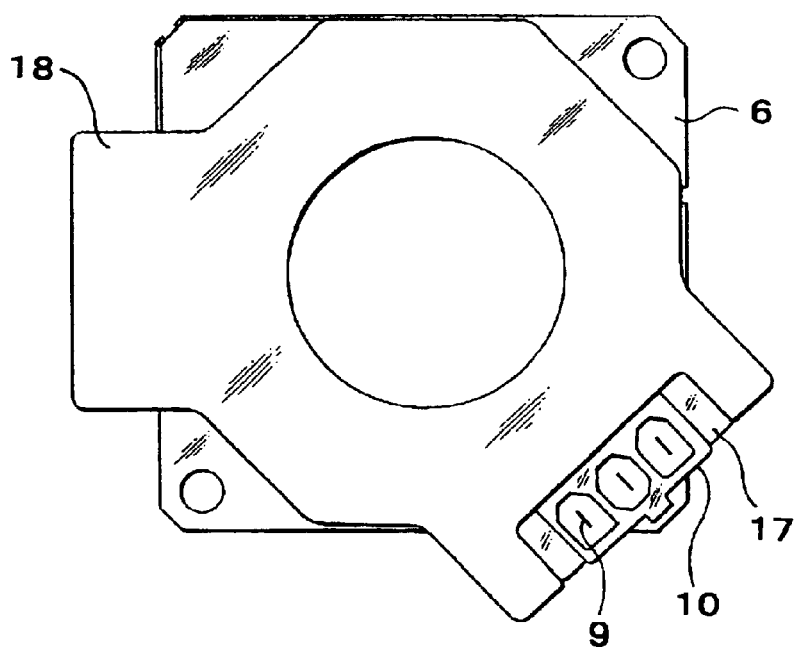
FIG. 8 is a plan view of a part of the terminal arrangement of the motor according to the present invention.

An insulating end bracket 18 is arranged on the upper surface of the printed circuit board 15 and on the upper surfaces of both sides of the insulating plate 17, so that the printed circuit board 15 is insulated electrically from the outside, as shown in FIG. 8.

Figure 9:
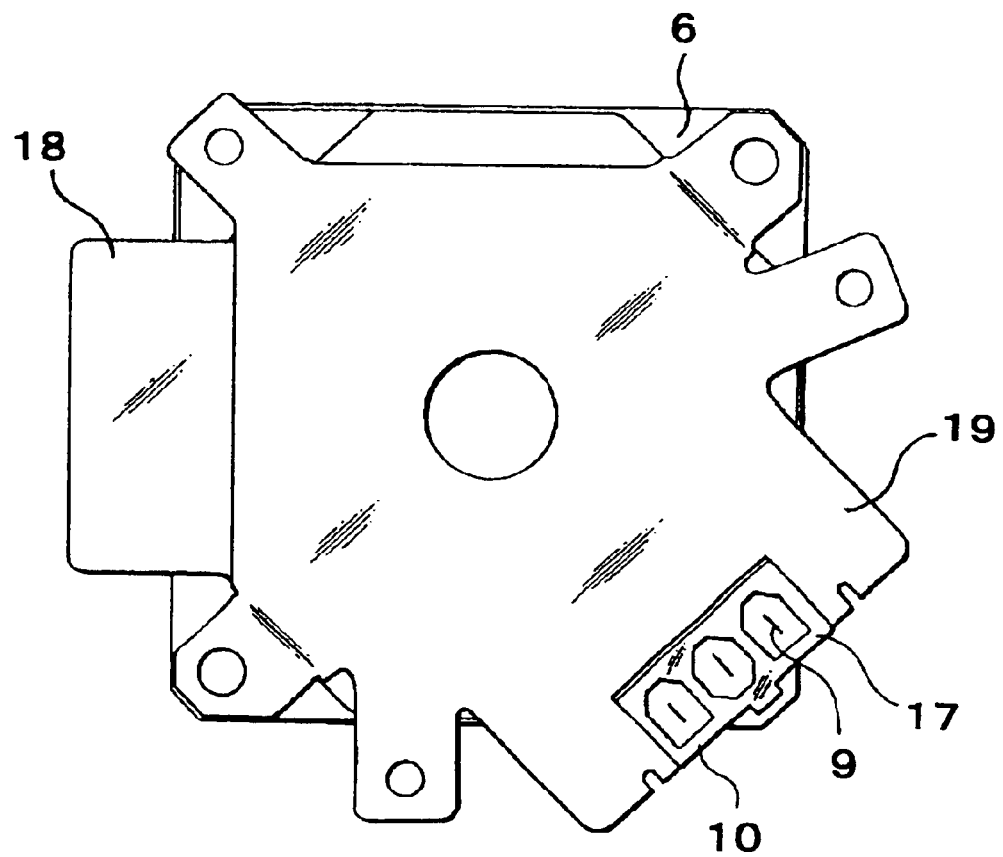
FIG. 9 is a plan view of a part of the terminal arrangement of the motor according to the present invention.

A metal end bracket 19 is arranged on the upper surface of the insulating end bracket 18, as shown in FIG. 9.

A metal end bracket similar to the metal end bracket 19 and an insulating end bracket similar to the insulating end bracket 18 are arranged on the other side of the iron core 6 and fixed together to the stator iron core 6 by mounting screws (not shown) through the stator iron core 6.

According to the terminal arrangement of the present invention, it is not necessary to connect each of the terminal pins 3 and 9 with each of the lead wires 4, so that the fablication thereof becomes simple and the insulating property is enhanced.

In the terminal arrangement of the present invention, the terminal base 10 fixed detachably to the stator iron core 6, and the printed circuit board 15 for connecting electrically the terminal pins 3 projected from the bobbins 2 and the terminal pins 9 projected from the terminal base 10 are used, so that it is not necessary to connect the terminal pins 3 and 9 by the lead wires 4, and that the printed circuit board 15 can be covered easily and simply by the end bracket 18 of the insulating material.

In case of the motor to be grounded, the electrical wiring therefore can be attained at the same time when the terminal base 10 is fixed to the stator iron core 6.

A second embodiment of a terminal arrangement according to the present invention will now be explained with reference to FIG. 10 to FIG. 14.

Figure 10:
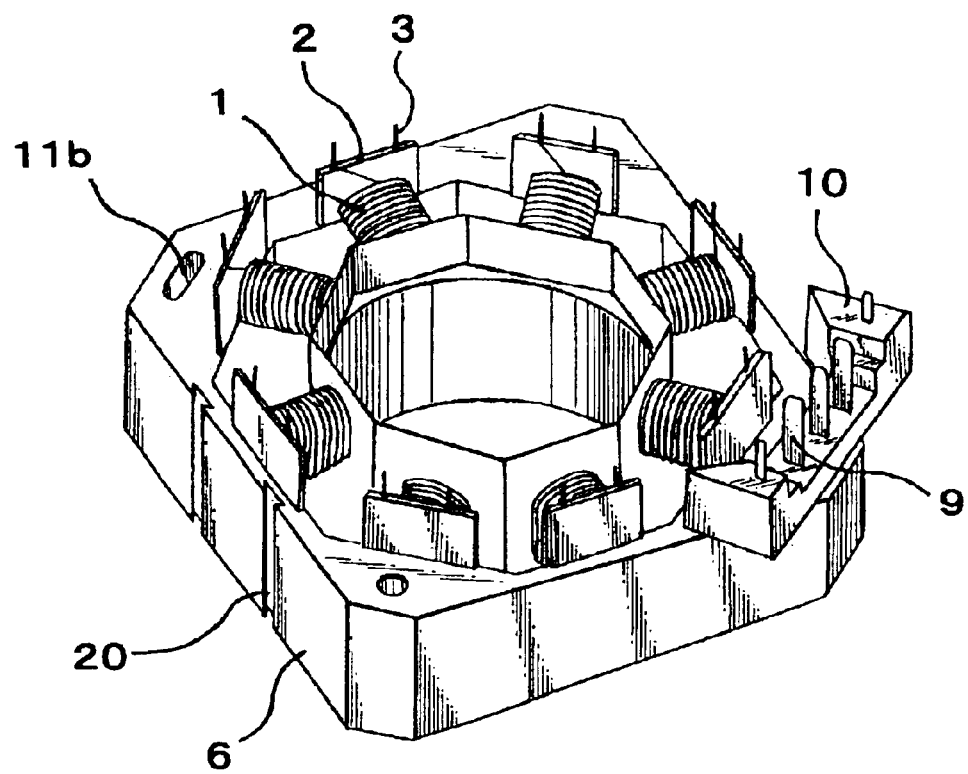
FIG. 10 is a perspective view of a part of a capacitor motor according to the present invention.
Figure 11:
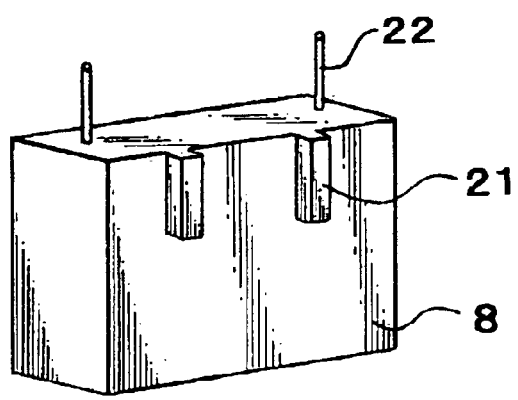
FIG. 11 is a perspective view of a capacitor of the capacitor motor according to the present invention.
Figure 12:
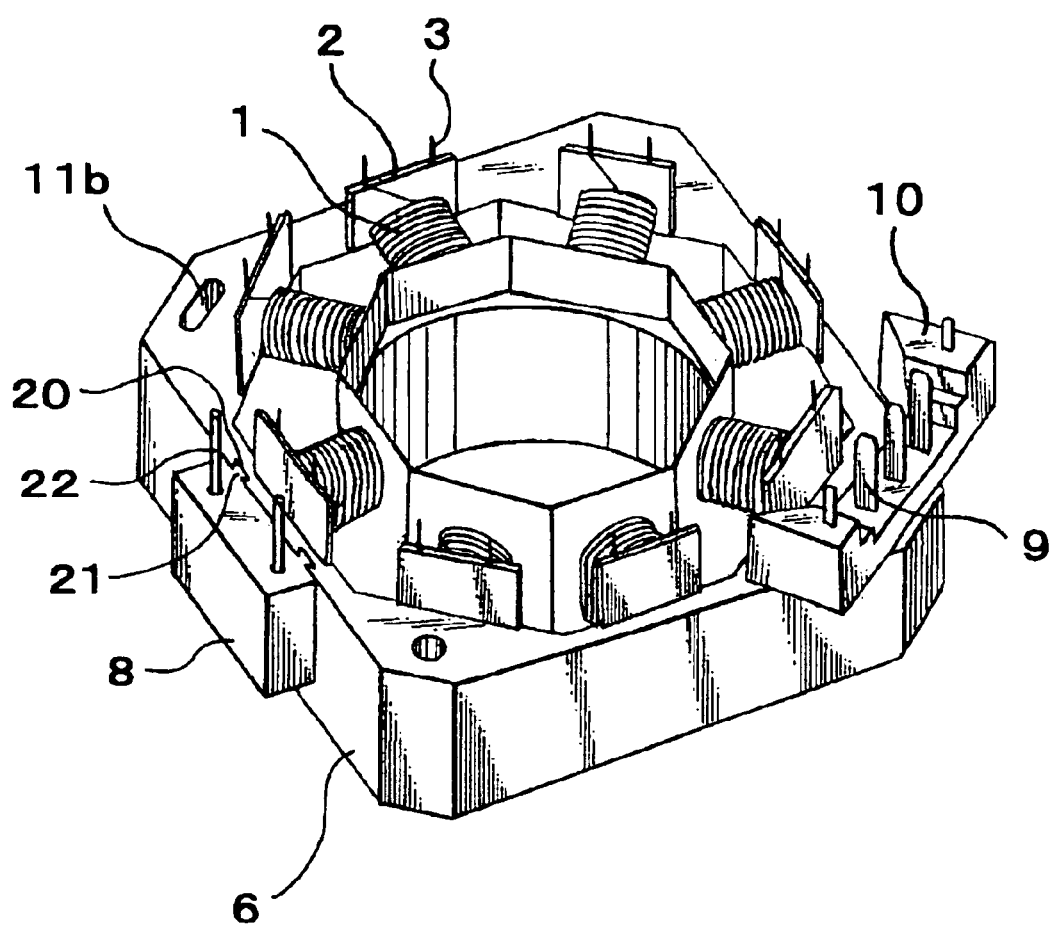
FIG. 12 is a perspective view of a part of the capacitor motor according to the present invention.

In this second embodiment, two grooves 20 separated from each other and extending axially of the stator iron core 6 of the motor are formed on an outer peripheral surface of the stator iron core 6 as shown in FIG. 10, and two ribs 21 corresponding to the grooves 20 are formed on a back surface of a phase advancing capacitor 8 as shown in FIG. 11, so that the capacitor 8 can be fixed detachably to the stator iron core 6 by press fitting the ribs 21 into the grooves 20 as shown in FIG. 12.

Further, terminal pins 22 are projected from an upper surface of the capacitor 8, as shown in FIG. 11, and the capacitor 8 is fixed on the stator iron core 6 so that the upper end of the pin 22 becomes identical in level substantially with the upper end of the terminal pin 3 of the bobbin 2, as shown in FIG. 12.

Figure 13:
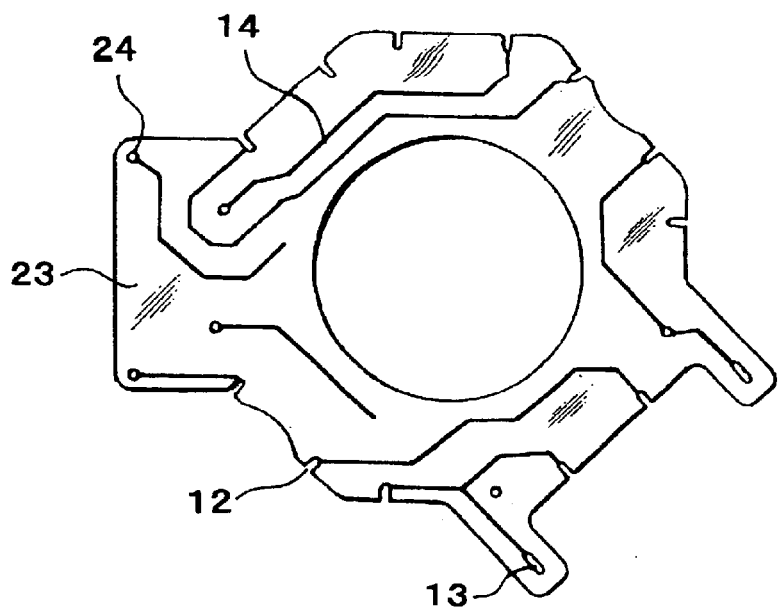
FIG. 13 is a plan view of a printed circuit board of the capacitor motor according to the present invention.
Figure 14:
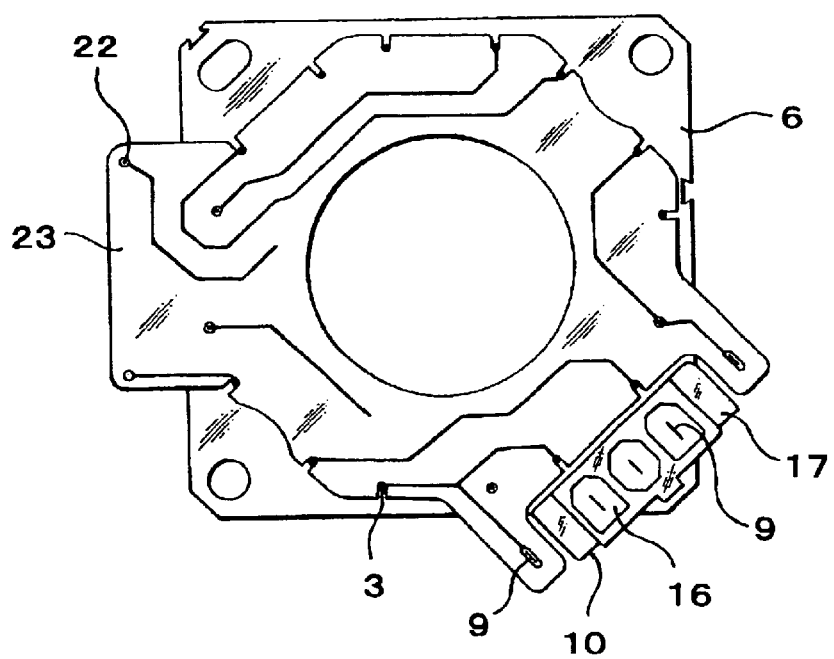
FIG. 14 is a plan view of a part of the terminal arrangement of the capacitor motor according to the present invention.

A printed circuit board 23 is formed with holes 12, 13 and 24 for receiving therein terminal pins 3 projected from the bobbins 2, the terminal pins 9 projected from the terminal base 10, and the terminal pins 22 projected from the capacitor 8 respectively, and with printed circuits 14 for connecting electrically the terminal pins 3, the terminal pins 9, and the terminal pins 22 as shown in FIG. 13. The printed circuit board 23 is arranged on one side surface of the motor having the terminal pins 3, 9 and 22, so that the terminal pins 3, 9 and 22 are inserted into the holes 12, 13 and 24, respectively, and that the pins 3, 9 and the pins 24 are connected electrically by the printed circuits 14.

According to this embodiment to the present invention, the capacitor 8 can be fixed easily and simply to the stator iron core of the motor without using any mounting screw or the like.

Further, the phase advancing capacitor 8 will be damaged at a high temperature and accordingly the phase advancing capacitor 8 is preferable to use at a low temperature. Accordingly, the motor of the present invention is most preferable to use as a fan motor or the like in which the temperature of the stator iron core is not increased.

While the invention has been particularly shown and described with reference to the preferred embodiments thereof, it will be understood by those skilled in the art that various changes in form and details may be made therein without departing from the spirit and scope of the invention as defined by the appended claims.

What is claimed is:

1. A terminal arrangement of a motor, comprising:
    a terminal base formed with a plurality of terminal pins, the terminal base being fixed detachably on a stator iron core of a motor,
    terminal pins formed on bobbins and connected electrically with windings wound around the bobbins,
    a printed circuit board arranged on the stator iron core so as to connect electrically the terminal pins formed on the bobbins with the terminal pins formed on the terminal base,
    an insulating plate having a separate hole surrounding each terminal pin, and
    an end bracket arranged so as to cover the printed circuit board and the insulating plate.

2. The terminal arrangement as claimed in claim 1, further comprising a hole formed in the stator iron core, and an earth electrode which projects from the terminal base and which is inserted into the hole so as to be connected electrically with the stator iron core, the earth electrode being connected electrically to one of the terminal pins formed on the terminal base.

3. A terminal arrangement of a motor, comprising:
    a terminal base having with a plurality of terminal pins, the terminal base being detachably fixable on a stator iron core of a motor,
    terminal pins which are provided on bobbins having windings round therearound and which are electrically connected to the windings wound around the bobbins, a printed circuit board which is arranged on the stator iron core so as to electrically connect the terminal pins formed on the bobbins to the terminal pins formed on the terminal base, an insulating plate having a separate hole surrounding each terminal pin, and an end bracket that covers the printed circuit board and the insulating plate.

4. The terminal arrangement as claimed in claim 3, wherein a hole is formed in the stator iron core, and further comprising an earth electrode which projects from the terminal base and which is inserted into the hole and electrically connected to the stator iron core, the earth electrode being electrically connected to one of the terminal pins on the terminal base.

* * * * *